Nov. 11, 1952 H. GANG 2,617,594
REGISTER RESETTING MEANS
Filed Nov. 8, 1949 6 Sheets-Sheet 1

Inventor
HERMAN GANG

*George V. Hall*

Attorney

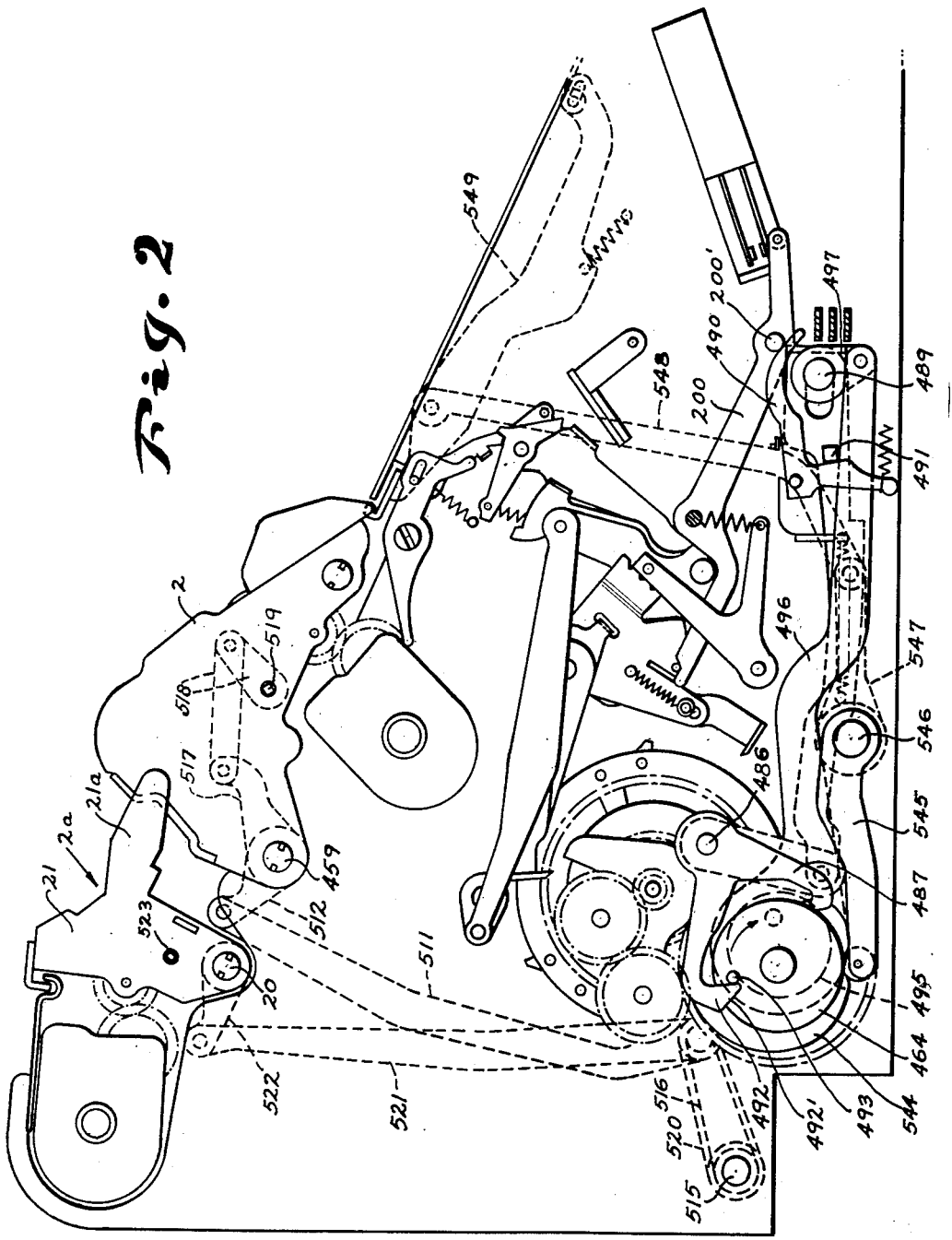

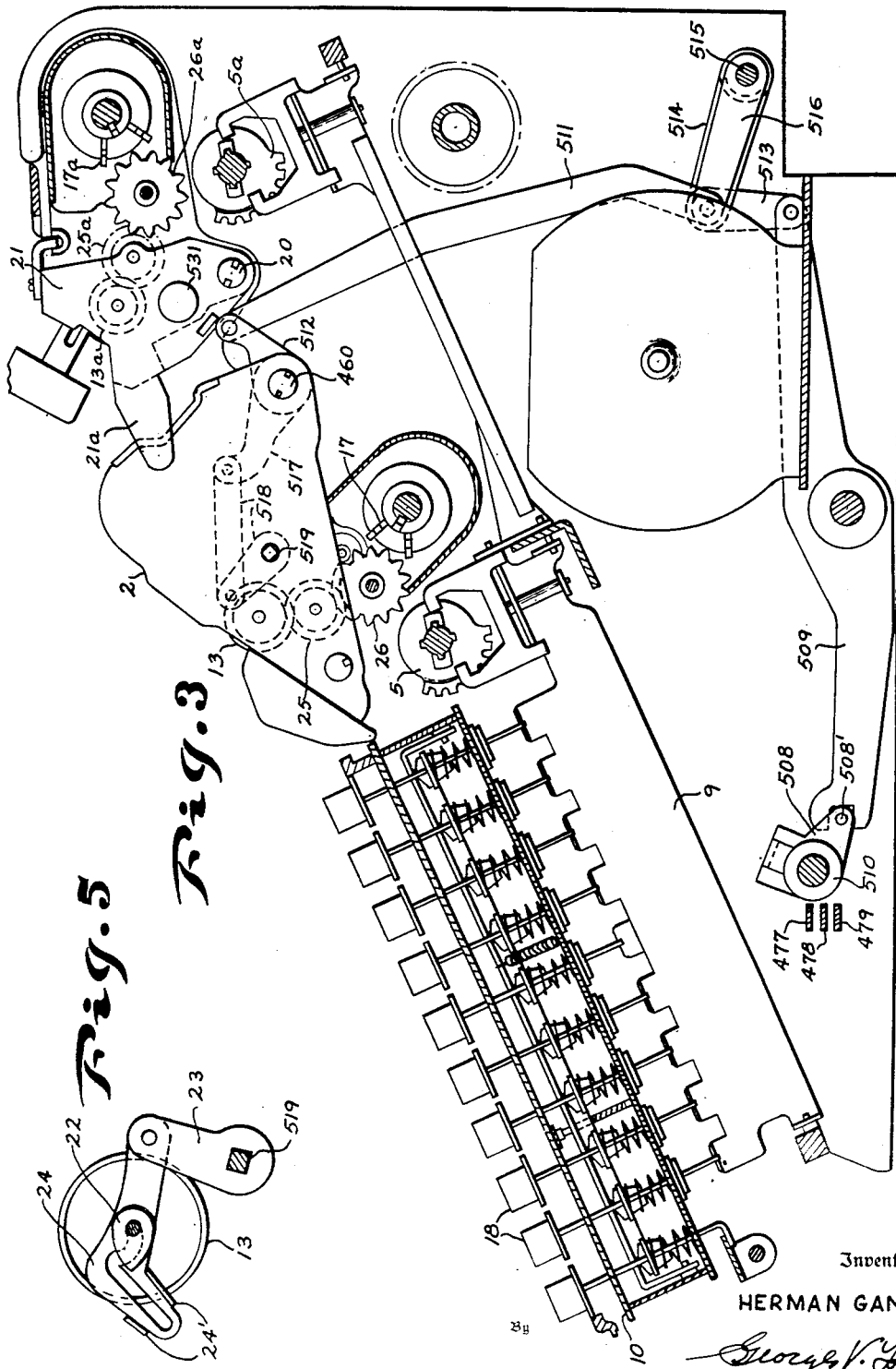

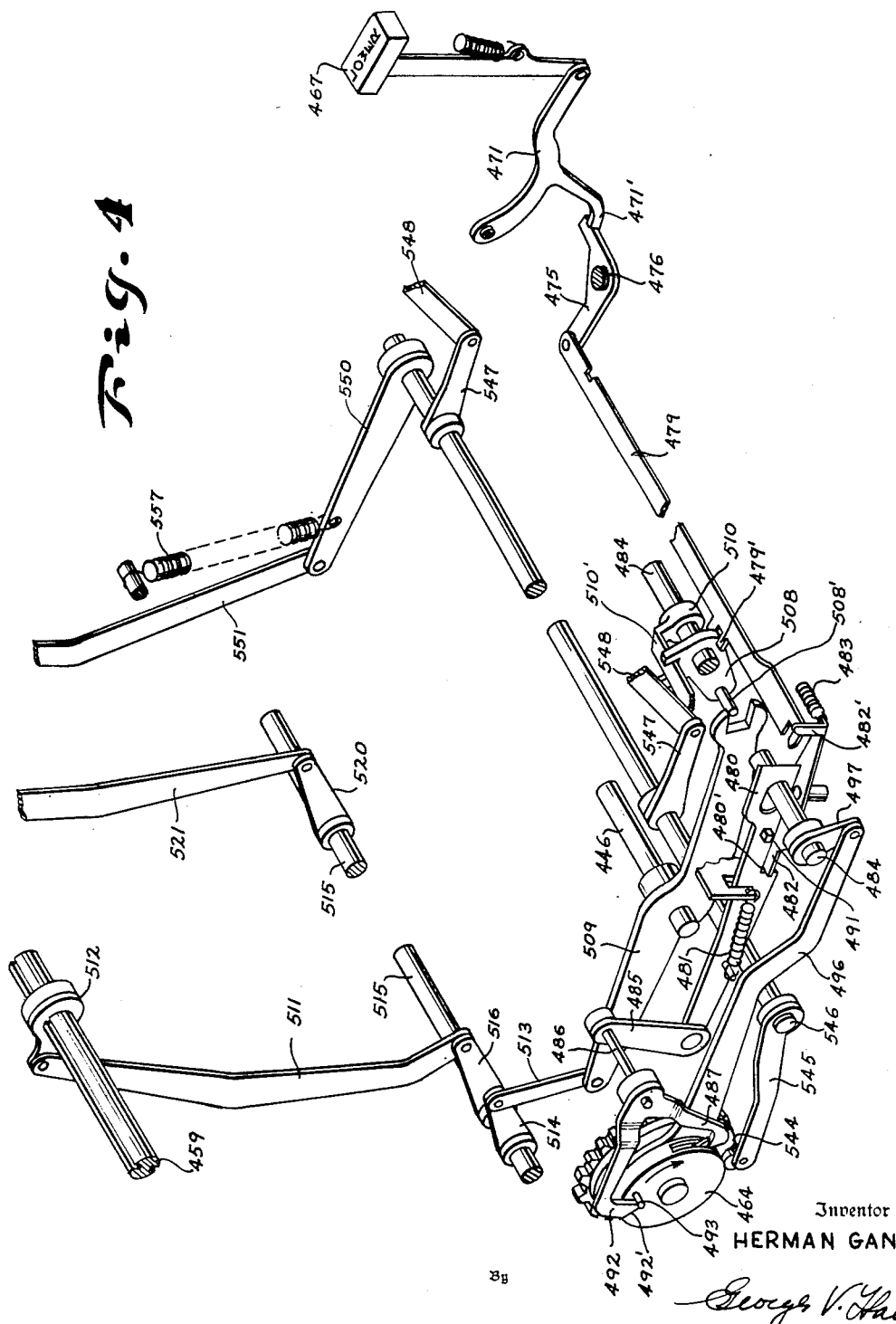

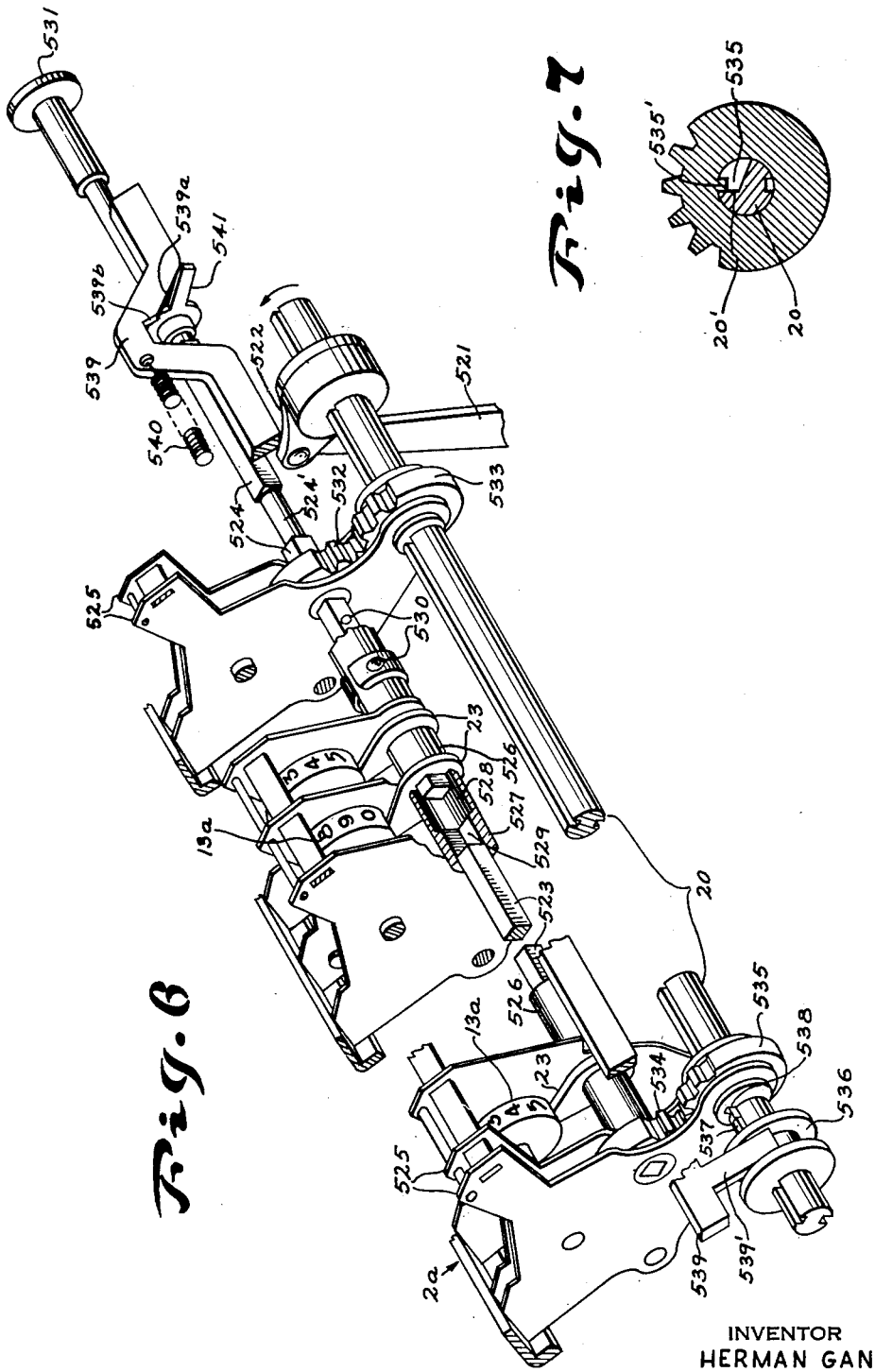

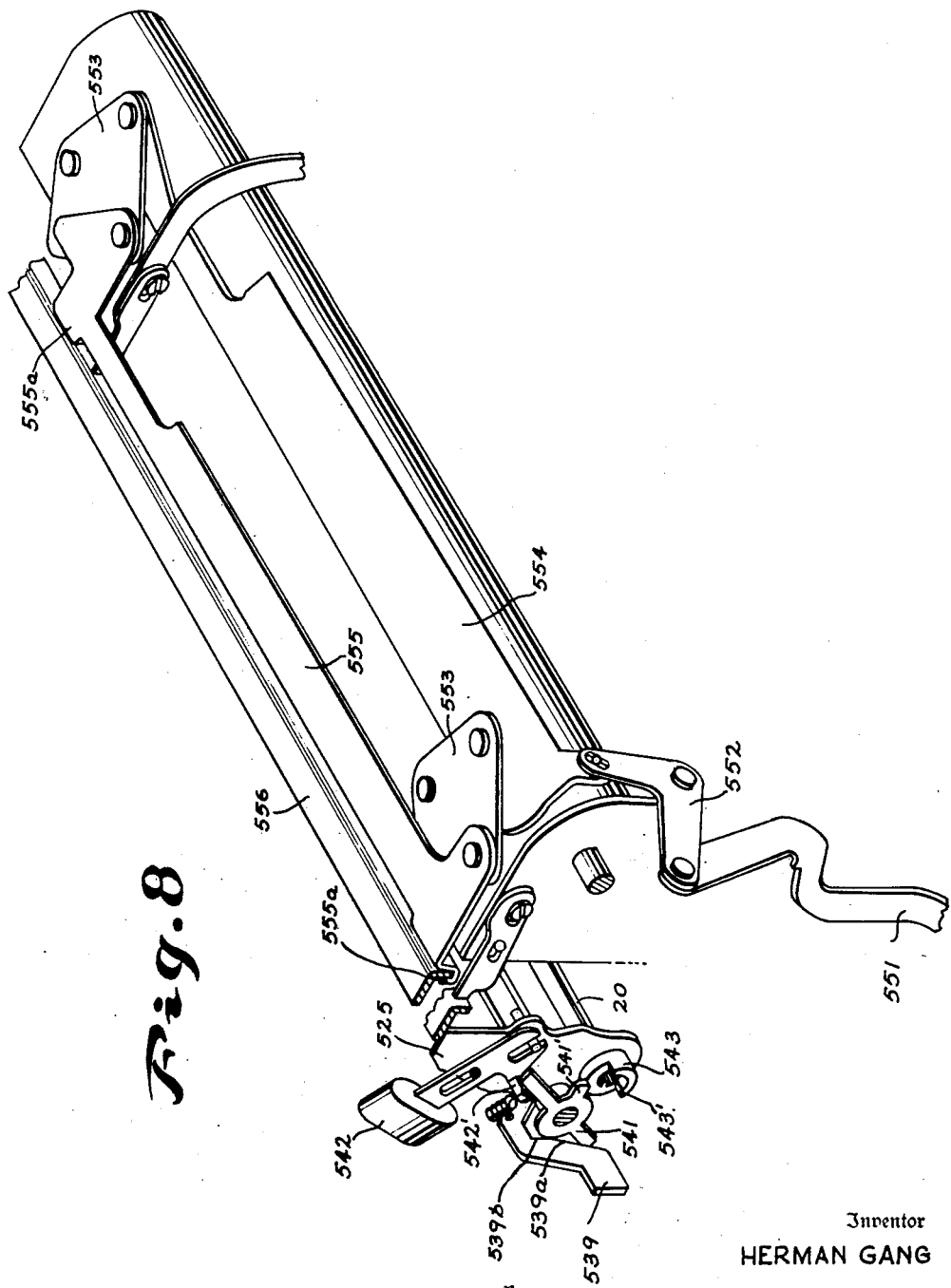

Patented Nov. 11, 1952

2,617,594

UNITED STATES PATENT OFFICE 2,617,594

REGISTER RESETTING MEANS

Herman Gang, Livingston, N. J., assignor to Monroe Calculating Machine Company, Orange, N. J., a corporation of Delaware Application November 8, 1949, Serial No. 126,157

9 Claims. (Cl. 235—144)

1

The invention relates to register resetting means for calculating machines and, more particularly, to means controlling the operation of a plurality of resetting mechanisms in association with a plurality of registers.

In the performance of certain work entailing a series of calculations, it is essential to register individually the result of each calculation, and also the sum or grand total of the series. To this end, calculating machines are customarily provided with a pair of registers which may be adapted for the simultaneous registration of an amount resultant of a calculation. By the usual provision of individually operable resetting mechanisms, one of the registers may be cleared while the registrations are retained in the other. Thus, a series of calculations may be performed with individual registration of each one of the series in the one register and the sum or grand total accumulated in the other. Upon completion of the work, both registers may be cleared by the individual and unrelated operation of the respective resetting mechanisms.

In many calculations of the type defined above, it is desirable to accumulate in the grand total register the sum of the individual registrations including only a given number of decimal orders. To effect this, the grand total register may be provided with a split clearing arrangement whereby resetting mechanism is operable to reset only the numeral wheels to the right of a given denominational order after each individual registration. In other calculations, for example in payroll work, it is desirable to complete the calculations to the nearest half cent. To provide for this, one of the wheels of each of the registers may be adapted for resetting to five instead of to zero so that a half cent or more registered in the wheel will effect a tens transfer to the next higher order wheel and thereby add a full count to that wheel. This arrangement necessitates the resetting in the grand total register of the so-called half cent wheel and all of the wheels to the right thereof after each individual registration of a series of calculations. This will be apparent when it is considered that a correct grand total will be registered only if each individual registration is effected with the half cent wheel so set as to effect a tens transfer upon registration therein of five or more. The above noted split clearing arrangement may therefore be adapted to reset the proper wheels after each individual registration as in the instance noted in connection with unwanted decimal accumulation.

2

The present invention provides improved control means for effecting selective operation of resetting mechanisms for a pair of registers and to thereby reduce the number of operations required to effect the desired resetting of the register as, for example, in calculations of the type outlined above. The arrangement is such that resetting mechanism for one of the registers has operating connection with a power source whereby depression of an operating member, such as a key, will invariably effect the resetting operation. The other (grand total) register is provided with individual resetting mechanisms; one for resetting a given number of the lower order wheels and another for resetting the higher order wheels. Manually adjustable means in association with a drive train from the power source provide the control means whereby the desired operations of the resetting mechanisms for the grand total register are effected in conjunction with the resetting of the other register. The invention, however, will best be understood from the following description with reference to the accompanying drawings in which:

Fig. 2 is a left side elevation of the machine showing the resetting clutch and related linkage.

Fig. 3 is a vertical section through the machine showing the sub-total and grand total carriages in elevation.

Fig. 4 is a fragmentary partly exploded perspective showing the resetting clutch and various connections for effecting the resetting operations.

Fig. 5 is a detailed side elevation of one of the register numeral wheels and a unit of the resetting mechanism related thereto.

Fig. 6 is an exploded fragmentary perspective with parts in section of the grand total carriage and the resetting power transmissions therefor.

Fig. 7 is a detailed section of a portion of one of the power transmission trains.

Fig. 8 is a fragmentary perspective of the grand total carriage and controls related thereto as viewed from the rear of the machine.

Figure 1:
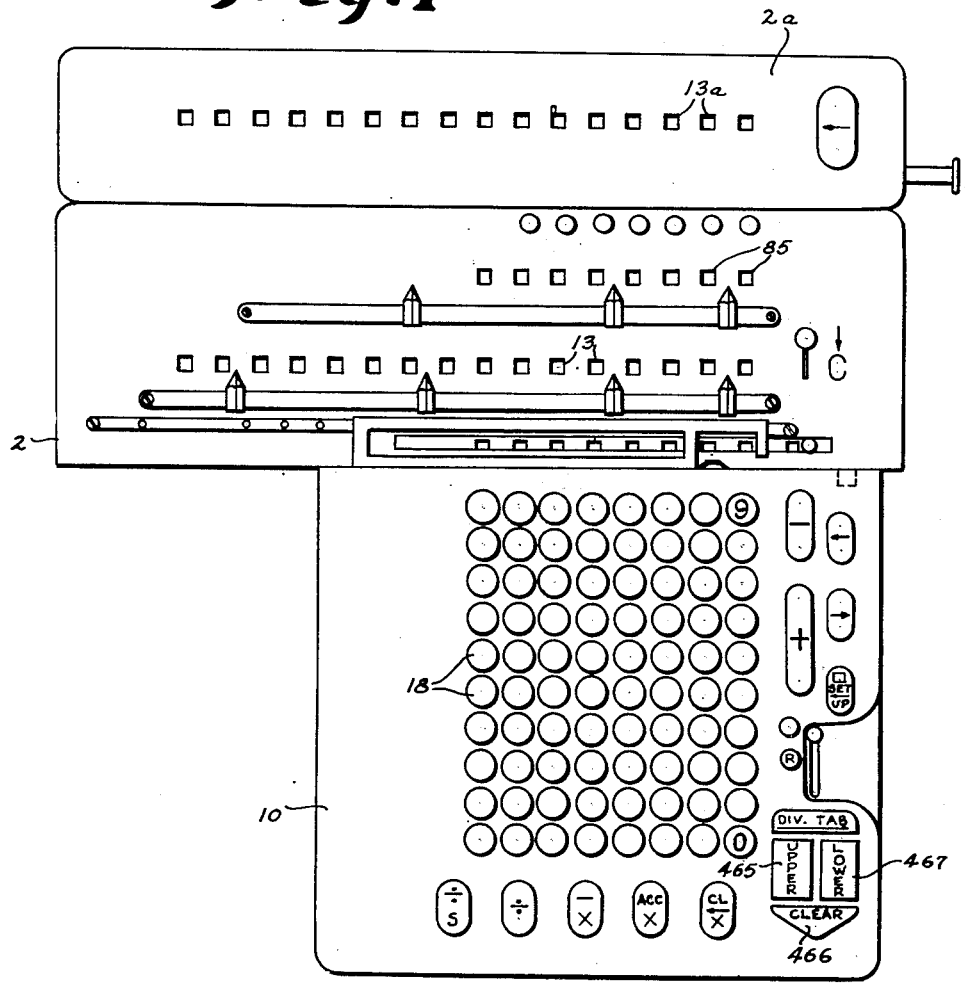
Fig. 1 is a plan view of a calculating machine embodying the invention.

The invention is disclosed as embodied in a non-listing calculating machine capable of performing the four rules of arithmetic substantially as disclosed in Patent No. 2,531,207, issued to me on November 21, 1950. The machine is provided with a dividend-product register comprising the numeral wheels 13 (Figs. 1 and 3) and hereinafter termed the sub-total register, and a grand total register comprising the numeral wheels 13a.

Sub-total wheels 13 are mounted in a longitudinally shiftable carriage 2 which is pivotally mounted at its rear on rockable splined shafts 459 and 460 (Figs. 2 and 3). At their outer ends, shafts 459 and 460 have pivotal bearing in the left and right end plates respectively of carriage 2 and extend inwardly in axial alignment with their inner ends juxtaposed and pivotally contained in a suitable bearing (not shown) in and midway of the length of the carriage in accordance with the disclosure of my aforenoted Patent No. 2,531,207. Intermediate their ends, shafts 459 and 460 are pivotally and slidably mounted in suitable bearings in the left and right side frames respectively of the machine. Shafts 459 and 460 are accordingly adapted to be rocked independently and the slidable mounting of the shafts in the machine frame permits the longitudinal shifting of the carriage.

Grand-total wheels 13a are mounted in a carriage 2a (Figs. 1, 2 and 3) which is located to the rear of and is simultaneously and coextensively shiftable with carriage 2. Carriage 2a is pivotally mounted at its under side on a splined shaft 20 which extends between the end plates of the carriage 2a. Intermediate its ends, shaft 20 is pivotally and slidably mounted in suitable bearings in the left and right hand side frames respectively of the machine. The slidable mounting of shaft 20 accordingly permits longitudinal shifting of carriage 2a. To provide for simultaneous and coextensive shifting of carriage 2a with carriage 2, the end plates 21 (Figs. 2 and 3) of carriage 2a are provided with forwardly extending fingers 21a which engage the end plates respectively of carriage 2. Therefore, when carriage 2 is shifted, the movement will be directly transmitted to one or the other of fingers 21a to likewise shift carriage 2a.

Actuating mechanism comprising the differential actuators 5 (Fig. 3) and the tens transfer actuators 17 are provided for the sub-total wheels 13. Grand-total wheels 13a are likewise provided with actuating mechanism comprising the differential actuators 5a and the tens transfer actuators 17a. Selection mechanism comprising selector bails 9 (Fig. 3) have operating connections with both differential actuators 5 and 5a to thereby adjust said actuators in accordance with values set in keyboard 10 when upon depression of keys 18. A suitable gear train (not shown) connects actuators 5a and 17a, at a one to one ratio with a drive means for actuators 5 and 17 and thereby provides, upon each cycle of operation, for simultaneous registration in wheels 13 and 13a of a value set in the keyboard.

Drive means for the actuating means, carriage shifting means, and drive means for the latter may be provided substantially in accordance with the disclosure of Patent No. 2,419,760, issued April 29, 1947, to E. F. Britten, in which a clutch mechanism is shown for driving the actuating mechanism or alternatively the carriage shifting mechanism. These operations, however, bear no relationship to the present invention and any suitable carriage shifting and registering mechanisms may be employed in a machine embodying this invention. Furthermore, the invention is not necessarily restricted for use in a machine having shiftably mounted registers. The above will be apparent when it is considered that the invention relates to the control of mechanisms to reset the registers and not to the means whereby the registrations are effected nor to the shiftability of the registers.

Resetting mechanism

The sub-total register comprising the wheels 13 is provided with an independently operable resetting mechanism, the drive for which is engaged and controlled substantially as disclosed in Patent No. 2,531,206, issued to me on November 21, 1950, to which reference is made for details of construction. The arrangement is such that depression of a key 467 (Figs. 1 and 4) will be effective to move a slide 479 toward the left of the machine. The movement of the slide is effective to engage a clutch 464 (Figs. 2 and 4) and connect a drive train for the resetting mechanism for sub-total wheels 13. As fully disclosed in my aforenoted copending application, keys 465 and 466 and related slides 477 and 478 (Figs. 1 and 3) are provided to control the operation of clutch 464 to reset numeral wheels 85 of the multiplier quotient register and to clear keyboard 10 respectively. The present invention, however, relates only to the operation of resetting mechanisms associated with the sub-total and grand-total registers, and therefore the operation of clutch 464 will be considered only in that connection.

Key 467 (Fig. 4) is held in normal raised position by a suitable spring and the lower end of the key stem is pivotally connected to the forward end of a lever 471 which is fulcrumed at its rear to the framing of the machine. Lever 471 is provided with a depending arm which terminates in a horizontally disposed finger 471' which is positioned to contact an arm of a bell crank 475. Bell crank 475 is fulcrumed on a fixed shaft 476 and its other arm is pivotally connected to slide 479 which extends across the machine. Thus, depression of key 467 will rock lever 471 clockwise, move slide 479 to the left, which slide is in engagement with ear 482', and thereby releases latch 482. Latch 482 is normally in engagement with a slide 480 slidably supported at its forward end on a shaft 484 to hold said slide in rearward position against the tension of a spring 481 tending to move slide 480 forward. Thus, movement of slide 479 will release slide 480 for forward movement. The leftmost end of slide 479 is provided with a recess in its rearward edge and when said slide is moved to its left or active position, the forward end of released slide 480 will enter said recess and hold slide 479 in active position until the engaging end of slide 480 has been removed.

Resetting clutch 464 is driven by a suitable gear train from the electric motor and is of well-known construction in which a spring pawl mounted on the driven member of the clutch is held out of engagement with the driving member by a detent. For this purpose, a detent 487 (Figs. 2 and 4) is fixed on a shaft 486 rotatably mounted in the left side frame. Shaft 486 has an arm 485 fixed thereto which arm is pivotally connected to the rear end of slide 480. Accordingly, when slide 480 is released and moved forwardly, the shaft 486 through arm 485 will be rocked counterclockwise, thus removing detent 487 from engagement with the pawl of clutch 464, thereby engaging the drive to the motor.

Upon engagement of clutch 464, the circuit switch contacts for the motor must be closed. For this purpose, a lever 490 (Fig. 2) pivotally mounted on the frame is urged counterclockwise by a suitable spring. A horizontally disposed arm of the lever 490 is in contact with a pin 200' on a forwardly extending arm of a lever 200. Normally, lever 490 is restrained from rotation by a lug 491 on slide 480. When slide 480 is released and moves forwardly, lever 490 will be moved counterclockwise by its spring and the arm of lever 200 will be lifted to close the circuit switch contact.

In order that clutch 464 (Figs. 2 and 4) shall make one cycle of operation and then be disengaged, provision is made to return detent 487 into position to engage the pawl of the clutch before the clutch has completed its cycle. To this end, detent 487 is provided with an arm 492, the free end of which is provided with a cam face 492'. When the detent is disengaged, the free end of arm 492 will be moved downwardly, thus bringing cam face 492' into position to be engaged by a pin 493 mounted on the driven member of clutch 464. As clutch 464 approaches full cycle position, pin 493 will engage cam face 492', thereby raising arm 492 and moving detent 487 into position to engage the pawl of clutch 464 and disconnect the drive when the clutch reaches full cycle position. As detent 487 is fast on shaft 486, the shaft will be rocked clockwise, thereby rocking arm 485 with it and moving slide 480 to the rear. Pin 493 of clutch 464 will pass under cam face 492', thereby providing sufficient movement to bring shoulder 480' of slide 480 to the rear of latch lever 482. In the rearward movement of slide 480, its forward end will be removed from the recess in slide 479 and thereby permit spring 483 to move latch 482 into position to engage shoulder 480' and ear 482' to restore slide 479. Slide 480 will thus be prevented from forward movement to reengage clutch 464.

The operation of latch 482 to prevent reengagement of clutch 464 will be effected only if key 467 is released before the completion of the clutch cycle. Should key 467 be held depressed, slide 479 would prevent the engagement of latch 482 with slide 480 and reengagement of clutch 464 would be effected. Although not desirable, the reengagement of clutch 464 would only result in the operation of the resetting mechanism again after having performed the resetting function. If it is desired to prevent this reengagement of clutch 464, an auxiliary latch (not shown) may be provided to operate in conjunction with latch 482. Such a dual latching arrangement for slide 480 is fully disclosed in the aforenoted Patent No. 2,531,206.

Clutch 464 in its cycle of operation furnishes the power to operate the resetting mechanisms (to be described) through suitable drive and power transmission trains which are connected to the clutch by the clutch engaging movement of slide 479. To this end, the driven member of clutch 464 is provided with an eccentric cam 495 as shown in dotted lines (Fig. 2). The eccentric cam imparts a reciprocatory movement to a link 496 (Figs. 2 and 4) which is attached at its foward end to a crank arm 497 which is fixed on rockable shaft 484 which extends across the machine and exteriorly of the left side frame. Thus, when clutch 464 is operated, shaft 484 is rocked clockwise during the first half cycle and during the second half cycle is rocked back to normal.

Slidably mounted on shaft 484 and positioned inwardly of the left side frame is a rearwardly extending arm 508 (Figs. 3 and 4) which is provided at its end with a leftwardly extending pin 508'. The hub portion of arm 508 is provided with an open end slot on its upper side. To the right of arm 508 and fixed on shaft 484, is a collar 510 having a leftwardly extending arm 510' which engages the slot of arm 508. Fulcrumed on a shaft 446 is a lever 509, the forward end of which is provided with an open end slot which is normally to the left and in horizontal alignment with pin 508' of arm 508. Slide 479 is provided with a rearward projection 479' having an open end slot engaging the hub of arm 508. Therefore, upon depression of key 467 and the resultant clutch engaging movement of slide 479, arm 508 will be moved to the left and pin 508' entered within the slot at the forward end of lever 509, and thereby establish a driving connection between arm 508 and lever 509. When shaft 484 is rocked by resetting clutch 464, arm 508 will be rocked through the arm 510' of collar 510 and pin 508' will be effective to rock lever 509 counterclockwise by raising its forward end.

The rearward end of lever 509 has link connection 513 (Figs. 3 and 4) with an arm 514 fixed on a pivotally mounted shaft 515 which extends between the machine side frames. Another arm 516 fixed on shaft 515 is pivotally connected at its end to the lower end of an upwardly extending link 511 which has a pivotal connection at its upper end with an arm 512. Arm 512 is splined on shaft 459 of carriage 2 and is restrained from lateral movement with the shaft by a suitable bearing in the left side frame. Thus, when lever 509 is rocked counterclockwise, shaft 515 will be rocked clockwise (Figs. 2 and 4) and splined shaft 459 will be rocked counterclockwise by arm 512 and link 511. Adjacent the inner side of the left end plate of carriage 2, an arm 517 (shown in dotted lines in Figs. 2 and 3) is fixed on shaft 459 and, through suitable linkage 518, is connected to a square shaft 519 which extends the length of the carriage and has suitable bearings in the carriage end plates. Therefore, when shaft 459 is rocked, shaft 519 will likewise be rocked to operate the resetting mechanism for wheels 13 of the sub-total carriage 2.

The resetting mechanism may be constructed in accordance with the structure fully disclosed in Patent No. 1,781,320, issued to L. P. Crosman, on November 11, 1930. It will be understood, however, that other well known resetting mechanisms are equally applicable for use in conjunction with the devices of the invention. In accordance with the disclosure of the aforenoted patent, each of the numeral wheels 13 is provided with a commonly known heart-shaped cam 22 (Fig. 5) fixedly mounted on the hub of the wheel. For operation in conjunction with the cams 22, a like number of arms 23 are fixed on shaft 519 and each arm is provided with a member 24 having a pair of oppositely disposed flanges 24'. The arrangement is such that upon rocking of shaft 519 one or the other of flanges 24' of each member 24 will engage the cam 22 of the related wheel 13 and thereby reset the wheel in the direction of the lesser travel. It will be seen, therefore, that a resetting operation for wheels 13 of the sub-total register 2 will be effected invariably upon depression of key 464.

Manually adjustable means are provided whereby a resetting operation for the sub-total wheels 13 will effect simultaneously a resetting operation for all of the wheels 13a of the grand-total register; and upon such operation, automatic means is provided to readjust said manual means so that depression of key 464 will thereafter effect only the invariable operation of the resetting mechanism for sub-total wheels 13. Alternatively, manually adjustable means is also provided whereby a resetting operation for sub-total wheels 13 will effect simultaneously a resetting operation for a portion of the grand-total register comprising a given series of lower order wheels 13a and thereby prevent the aforenoted unwanted accumulation. Such latter adjustable means is adapted to remain in set position until manually readjusted.

In the achievement of the above-noted resetting operations, individual resetting mechanisms are provided for one and for another portion comprising respectively a given series of the higher and lower orders of numeral wheels 13a of the grand-total register. Each of the individual resetting mechanisms is operable by a power transmission train including splined rock shaft 20 (Figs. 2, 3 and 6) of the grand-total register. Shaft 20 is adapted to be rocked each time clutch 464 operates to reset the wheels 13 of the sub-total register 2. It will be recalled that the drive train for the resetting mechanism for the sub-total register includes a shaft 515 (Figs. 2 and 4) which is rocked in the resetting operation. Fixed on shaft 515 inwardly of the right side frame is an arm 520 having pivotal connection at its end to the lower end of an upwardly extending link 521. Link 521 is pivotally connected at its upper end to an arm 522 (Figs. 2 and 6) which is splined on shaft 20 and the hub portion of said arm is rotatably supported and restrained from lateral movement with the shaft by a suitable bearing in the machine framing. Therefore, in the resetting operation for the sub-total register, splined shaft 20 will be rocked in counterclockwise direction by shaft 515, arm 520, link 521, and arm 522.

Individual transmission means is provided to deliver power from splined shaft 20 for operating the individual grand total resetting mechanisms respectively. Alternatively, however, the manually adjustable means provides that the power transmission for the resetting mechanism for the portion of the register including the higher order wheels 13a may be connected to operate simultaneously the resetting mechanism for the portion including the lower order wheels. The two power transmissions include the axially aligned and rockable square shafts 523 and 524 (Fig. 6) respectively. As clearly illustrated in Fig. 6, shaft 523 is related to the higher order portion of wheels 13a and shaft 524 to the lower order portion of wheels 13a. Shaft 523 is provided with suitable bearings in the leftmost end plate and the partition plates 525 of carriage 2a and is restrained from longitudinal movement by spacing collars 526 fixed on the shaft between the partition plates. Mounted on shaft 523 and adapted for rocking movement therewith are arms 23 which operate resetting members (not shown) for the higher order wheels 13a, and the resetting members are constructed and operated in accordance with resetting members 24 shown and described in connection with wheels 13 of the sub-total register.

Shaft 524 is journalled in suitable bearings in the right end plate and the partition plates 525 of carriage 2a. Unlike shaft 523, however, shaft 524 is adapted for longitudinal movement which is permitted by mounting its spacing collars 526 loosely on the shaft between the partition plates. Furthermore, shaft 524 is provided with a reduced cylindrical portion 524' for a purpose hereinafter described. Resetting arms 23 are adapted for rocking movement with shaft 524 by the provision of square openings through which the shaft slidably passes and the arms are prevented from longitudinal movement with the shaft by the spacing collars 526. Arms 23 rocked by shaft 524 operate resetting members for the lower order wheels 13a as described in connection with higher order wheels 13a and wheels 13.

Fixed to the right end of square shaft 523 (Fig. 6) is a cylindrical coupling member 527 having at its free and projecting end an internal cylindrical recess 528, and at its left end a square recess 529 adjacent the right end of shaft 523. Slidable shaft 524 is retained in either of two positions by a ball and clip device 530 which retains the shaft in either position to which it is moved by a knob 531 attached to the right end of the shaft exteriorly of the carriage end plate. In the position shown in Fig. 6, the left end of slidable shaft 524 is extended a short distance into the cylindrical recess 528. In this position, shaft 524 is allowed free and independent rocking movement with relation to shaft 523 and the lower order portion of wheels 13a may therefore be reset independently of the higher order portion of wheels 13a. However, when shaft 524 is adjusted leftwardly from the position shown, its left end will enter the square recess 529 of coupling 527 and be connected for rotation with shaft 523. In this position, it will be seen that if shaft 523 is rocked to reset the higher order portion of wheels 13a, shaft 524 will likewise be rocked to reset the lower order portion of wheels 13a.

To provide a disengageable driving connection between splined shaft 20 (Fig. 6) and adjustable shaft 524, a segmental gear 532, having a square opening extending axially through its hub portion to permit the passage of shaft 524, is journalled in a pair of the partition plates 525. That is, the hub portion projects from the opposite sides of gear 532 and is suitably journalled in the respective partition plates 525 which also act to restrain the gear from lateral movement during adjustment of shaft 524.

As heretofore noted, shaft 524 is provided with a reduced cylindrical portion 524'. When shaft 524 is uncoupled from shaft 523 as shown in Fig. 6, the reduced portion 524' is positioned adjacent and to the right of gear 532 and its square portion extended through the square opening of the gear hub to establish a driving connection whereby the gear will be effective to rock the shaft. If, however, shaft 524 is adjusted to the left, thereby coupling it with shaft 523, its reduced cylindrical portion 524' will be moved into registration with the square opening in the hub of gear 532, thereby uncoupling the drive by permitting idle rotation of the gear. Meshing with segmental gear 532 and splined on shaft 20 is a segmental gear 533 which is also restrained from lateral movement by partition plates 525. Therefore, when shaft 20 is rocked upon a resetting operation for the sub-total register, gear 533 will be effective to drive gear 532.

It will be seen, therefore, that if shaft 524 is adjusted to position wherein it is uncoupled from shaft 523 and coupled with gear 532, a resetting operation for the lower order wheels 13a of the grand-total register will be effected in conjunction with a resetting operation for the sub-total register. Thus, the accumulation in the grand-total register will comprise only the sum of the individual registrations in the higher order portion of wheels 13a. However, with shaft 524 adjusted to position wherein it is coupled with shaft 523 and uncoupled from gear 532, a resetting operation for the sub-total register will be ineffective to operate either of the individual resetting mechanisms for the grand total register. Thus, the accumulation in the grand total register will comprise the sum of all of the registrations in wheels 13a.

At the end of a series of calculations, it is essential to completely reset both the grand-total register and the sub-total register. To this end, normally disengaged driving means is provided for connecting shaft 523 with splined shaft 20. Such means includes a segmental gear 534 fast on shaft 523 and a segmental gear 535 meshing with gear 534 and mounted on splined shaft 20 for limited rotation thereon. Gears 534 and 535 are mounted between a pair of the partition plates 525 and are provided with hub portions having suitable bearings in the plates. Gear 535 is provided with an internal tooth 535' (Fig. 7) normally engaging a shoulder 20' formed by milling a transverse slot in the surface of shaft 20. As clearly shown in Fig. 7, when shaft 20 is rocked counterclockwise and return in a resetting operation for the sub-total register, no movement will be transmitted to gear 535 and consequently no resetting operation will be effected for higher order portions of grand total wheels 13a. Manually adjustable means comprising a clutch or coupling 536 is provided to connect gear 535 for rocking movement with shaft 20. Coupling 536 is in the form of a flanged collar and is splined and slidably mounted on shaft 20 to the left (Fig. 6) of gear 535. Coupling 536 is provided with a key 537 seated in a keyway in the hub of the coupling and registering with the spline of shaft 20 slidable therein with said coupling on the shaft. The hub of gear 535 is provided with a keyway 538 for the reception of key 537 upon movement of coupling 536 to the right (Fig. 6) on shaft 20 to thereby transmit the rocking movement of said shaft to said gear through the coupling. A slide 539 extending the length of carriage 2a and slidably supported at its ends in the end plates respectively of the carriage is provided, adjacent its left end, with a depending arm 539' engaging coupling 536 between its flanges. Adjacent its opposite end, the slide is provided with an inclined edge 539a and a holding edge 539b. Slide 539 is normally urged to its leftmost position by a spring 540 (Fig. 6), thereby maintaining coupling 536 in disengaged position. A latch 541 (Figs. 6 and 8) in the form of a two armed lever is rotatably mounted on adjustable shaft 524 and is restrained from lateral movement by a pair of the partition plates 525, one of which is shown in Fig. 8.

The stem of a key 542 (Figs. 1 and 8) has suitable pin and slot mounting on one of the partition plates 525 adjacent latch 541 and extends upwardly through the cover plate of carriage 2a (Fig. 1). The stem of key 542 is provided with a leftwardly extending arm 542' which is positioned to engage one of the arms of latch 541 upon depression of said key. A suitable spring attached to the arm 542' holds the key in normal raised position. Upon depression of key 542, arm 542' will engage the upper arm of latch 541 and rotate said latch in clockwise direction in Fig. 8 (counterclockwise direction in Fig. 6). The oppositely disposed arm of latch 541 is located beneath and adjacent the inclined edge 539a of slide 539. Consequently, upon rotation of the latch, said oppositely disposed arm will engage inclined edge 539a and cam slide 539 toward the right as shown in Fig. 6 (toward the left in Fig. 8); and move coupling 536 to engage the drive for gear 535. At the completion of its camming movement, the arm of latch 541 will engage the holding edge 539b of slide 539 and thereby prevent its retraction by spring 540. From an inspection of Fig. 8 it will be observed that arm 542' of key 542 may be adapted for pivotal connection with the arm of latch lever 541 in lieu of engagement therewith. With such an arrangement, key 542 would remain depressed when latch 541 is in slide latching position and thereby permit manual retraction to release the latch should the operator unintentionally depress said key. A drive from shaft 20 to shaft 523 will thus be established and the rocking of shaft 20 as an incident to a resetting operation for the sub-total register will rock shaft 523 to operate the resetting mechanism for the higher order portion of wheels 13a of the grand total register. If shaft 524 is in the adjusted position shown in Fig. 6, a resetting operation for lower order wheels 13a will be effected simultaneously with a resetting operation for the higher order wheels but through the drive train comprising gears 532 and 533. If, however, shaft 524 is adjusted toward the left (Fig. 6), it will be coupled to shaft 523 and uncoupled from gear 532. Therefore, rocking of shaft 523 to clear higher order wheels 13a will likewise rock shaft 524 and simultaneously clear the lower order wheels.

As heretofore noted, provision is made to disengage coupling 536 automatically upon completion of the resetting operation so that subsequent operation of resetting clutch 464 will be effective only to reset the sub-total register either independently or in conjunction with lower order wheels 13a of the grand total register, depending upon the adjustment of shaft 524. To effect this, a collar 543 (Fig. 8) is fixed on splined shaft 20. Collar 543 is cut away to provide a shoulder 543' which underlies a lug 541' on latch 541 when said latch is moved to holding position. Therefore, when shaft 20 is rocked in the resetting operation, shoulder 543' of collar 543 will engage lug 541' of latch 541, thereby moving said latch from engagement with holding edge 539b of slide 539. This releasing movement of collar 543 is effected before the completion of the resetting movement of shaft 20 and not when said shaft is rocked back to normal. Spring 540 of slide 539 will, however, be ineffective to restore said slide and disengage coupling 536 until the resetting operation is completed as the friction of key 537 in keyway 538 will prevent the disengaging movement. Upon reversal of shaft 20, the friction between the parts will be relieved and spring 540 will be effective to restore slide 539 and thereby disengage coupling 536. However, upon the return movement of shaft 20, shoulder 20' (Fig. 7) engaging internal tooth 535' of gear 535 will be effective to move said gear and the parts driven thereby to normal positions.

To effect the resetting operations as described in the foregoing, it is necessary that the intermediate gears 25 and 25a in carriages 2 and 2a respectively (Fig. 3) be out of mesh with the respective intermediate gears 26 and 26a in the machine body. Therefore, upon operation of clutch 464, provision is made to rock carriage 2 upwardly about its fulcrum on shafts 459 and 460 at its rear and to rock carriage 2a forwardly about its fulcrum on shaft 20. The rocking of the carriages is simultaneously effected upon each operation of resetting clutch 464 by a cam 544 (Figs.

2 and 4) fixed for rotation with the driven member of said clutch. In normal position the low portion of cam 544 is normally engaged by an anti-friction roller at the end of an arm 545 fast on a shaft 546 which extends across the machine and has suitable bearings in the side frames of the machine. At the beginning of a resetting cycle, cam 544 will rock shaft 546 counterclockwise (Figs. 2 and 4) and hold said shaft in rocked position until near the end of the cycle at which time the low portion of the anti-friction roller of arm 545 will again engage the low portion of the cam. Fixed on shaft 546 adjacent the inner faces respectively of the right and left side frames are a pair of forwardly extending arms 547 which have link connections 548 with a pair of carriage lifters 549 respectively, as shown in dotted lines in Fig. 2. One of the lifters 549 is pivotally mounted at its forward end on the inner face of the left side frame and extends toward the rear where it engages the forward edge of carriage 2. The other lifter 549 (not shown) likewise engages carriage 2 and in like manner is mounted on the right hand side frame. Therefore, when shaft 546 is rocked, links 548 will be raised and likewise raise the rearward ends of lifter 549 and rock carriage 2 upwardly to disengage the intermediate gears.

To simultaneously rock carriage 2a, shaft 546 is provided with a rearwardly extending arm 550 (Fig. 4) exteriorly of the right side frame which arm 550 has a link connection 551 (Figs. 4 and 8) with one arm of a bell crank 552 which is pivotally mounted on the rear framing of the machine. A pair of bell cranks in the form of plates 553 (Fig. 8) are pivotally mounted on the top framing of the machine rearwardly of carriage 2a and in spaced relationship adjacent the sides respectively of the machine. The rearwardly extending arms of cranks 553 are connected by a link 554 and the left end of the link is connected to the other arm of bell crank 552. The leftwardly disposed arms of cranks 553 are connected by a link 555 which extends across the machine to the rear and adjacent carriage 2a and is provided with a pair of forwardly extending claws 555a (Figs. 2, 3, and 8) adjacent its ends. Extending across the top of carriage 2a at its rear is a plate 556 provided with a downwardly turned rear edge in position for engagement by claws 555a of link 555.

When shaft 546 is rocked, link 551 will be moved downwardly by arm 550 and bell crank 552 (Fig. 8) will be rocked in counterclockwise direction. Link 554 will therefore be moved to the left and cranks 553 rotated in clockwise direction, thereby moving link 555 forwardly and claws 555a engaging plate 556 will rock carriage 2a about its pivot on shaft 20 to disengage the intermediate gears. At the end of the resetting cycle, the anti-friction roller on arm 545 (Figs. 2 and 4) will engage the low portion of cam 544 and a spring 557 attached to arm 550 will then be effective to rock carriages 2 and 2a back to normal.

Although a particular embodiment of the invention has been shown and described, it will be understood that its application is not to be restricted to this specific embodiment except as required by the scope of the appended claims.

I claim:

1. In a motor operated calculating machine having a pair of registers and individual resetting mechanisms for each of said registers; drive means for operating one of said register resetting mechanisms, a power transmission train including a coupling adjustable to connect or disconnect the other resetting mechanism with said drive means, spring means for urging said coupling to disconnected position, a manually operable member for causing adjustment of said coupling to connected position, a latch for holding said coupling in connected position against the tension of said spring means and a member operable by said power transmission train for releasing said latch.

2. In a motor operated calculating machine having a pair of registers and individual resetting mechanisms for each of said registers; drive means for operating one of said register resetting mechanisms, a power transmission train including a coupling adjustable to connect or disconnect the other resetting mechanism with said drive means, spring means for urging said coupling to disconnected position, a latching member operable to move to and then to hold said coupling in connected position against the tension of said spring means, a manually operable member for effecting the aforesaid operation of said latching member and a member operable by said power transmission train for moving said latching member from holding position.

3. In a motor operated calculating machine having a pair of registers and individual resetting mechanisms for each of said registers; drive means for operating one of said register resetting mechanisms, a power transmission train including a coupling adjustable to connect or disconnect the other resetting mechanism with said drive means, spring means for urging said coupling to disconnected position, a slide having an operating connection with said coupling; said slide having an inclined edge and a holding edge, latching means operable to engage said inclined edge thereby camming said slide to adjust said coupling to connected position and then to engage said holding edge to maintain said coupling in connected position against the tension of said spring means, a manually operable member for effecting the aforesaid operation of said latching means and a member operable by said power transmission train for moving said latching means from holding position.

4. The invention according to claim 3 wherein the power transmission train includes a rockable shaft on which the adjustable coupling is mounted and the member for moving the latching means from holding position is mounted on and rockable with said shaft.

5. In a motor operated calculating machine having a first and a second register, each comprising a series of numeral wheels; the combination with resetting mechanism for said first register, of individual resetting mechanisms for one and for another portion respectively of the numeral wheel series of said second register, drive means for operating the resetting mechanisms for said first register and for one of said portions of said second register, a power transmission train including a coupling adjustable to connect or disconnect the resetting mechanism for the other said portion of said second register with said drive means, spring means for urging said coupling to disconnected position, a manually operable member for causing adjustment of said coupling to connected position, a latch for holding said coupling in connected position against the tension of said spring means and a member operable by said power transmission train for releasing said latch.

6. In a motor operated calculating machine having a first and a second register, each comprising a series of numeral wheels; the combination with resetting mechanism for said first register, of individual resetting mechanisms for one and for another portion respectively of the numeral wheel series of said second register, drive means for operating the resetting mechanisms for said first register and for one of said portions of said second register, a power transmission train including a coupling adjustable to connect or disconnect the resetting mechanism for the other said portion of said second register with said drive means, spring means for urging said coupling to disconnected position, a latching member operable to move to and then to hold said coupling in connected position against the tension of said spring means, a manually operable member for effecting the aforesaid operation of said latching member and a member operable by said power transmission train for moving said latching member from holding position.

7. In a motor operated calculating machine having a first and a second register, each comprising a series of numeral wheels; the combination with resetting mechanism for said first register, of individual resetting mechanisms for one and for another portion respectively of the numeral wheel series of said second register, drive means for operating the resetting mechanism for said first register, a drive train for delivering power from said drive means, a power transmission for operating the resetting mechanism for one of said portions of said second register, a clutch for connecting said power transmission with said drive train, a manually operable member for causing the engagement of said clutch, a member operable by said drive train to disengage said clutch, and a power transmission for operating the resetting mechanism for the other said portion of said second register including manually adjustable couplings for connecting said transmission with said other power transmission or alternatively with said drive train.

8. In a motor operated calculating machine having a first and a second register, each comprising a series of numeral wheels; the combination with resetting mechanism for said first register, of individual resetting mechanisms for one and for another position respectively of the numeral wheel series of said second register, drive means for operating the resetting mechanism for said first register, a drive train for delivering power from said drive means, a power transmission for operating the resetting mechanism for one of said portions of said second register, a clutch for connecting said power transmission with said drive train, a control member movable to engage or disengage said clutch, spring means for urging said control member to clutch disengaging position, a manually operable member for moving said control member to clutch engaging position, a latch for holding said control member in clutch engaging position against the tension of said spring means, a member operable by said drive train for releasing said latch, and a power transmission for operating the resetting mechanism for the other said portion of said second register including manually adjustable couplings for connecting said transmission with said other power transmission or alternatively with said drive train.

9. In a motor operated calculating machine having a first and a second register, each comprising a series of numeral wheels; the combination with resetting mechanism for said first register, of individual resetting mechanisms for one and for another portion respectively of the numeral wheel series of said second register, drive means for operating the resetting mechanism for said first register, a drive train for delivering power from said drive means, a power transmission for operating the resetting mechanism for one of said portions of said second register, a clutch for connecting said power transmission with said drive train, a control member movable to engage or disengage said clutch, spring means for urging said control member to clutch disengaging position, a latching member operable to move to and then to hold said control member in clutch engaging position against the tension of said spring means, a manually operable member for effecting the aforesaid operation of said latching member, a member operable by said drive train for moving said latching member from holding position, and a power transmission for operating the resetting mechanism for the other said portion of said second register including manually adjustable couplings for connecting said transmission with said other power transmission or alternatively with said drive train.

HERMAN GANG.

REFERENCES CITED

The following references are of record in the file of this patent:

UNITED STATES PATENTS

| Number | Name | Date |
|---|---|---|
| 1,061,137 | Stemmler et al. | May 6, 1913 |
| 1,860,490 | Britten, Jr. | May 31, 1932 |
| 1,974,529 | Brown | Sept. 25, 1934 |
| 2,294,083 | Friden | Aug. 25, 1942 |
| 2,403,111 | Moody | July 2, 1946 |
| 2,251,799 | Lydfors | Sept. 12, 1950 |